June 2, 1942.　　A. E. WILSHUSEN　　2,284,936
DIRECTION INDICATOR MEANS

Filed Nov. 28, 1940

INVENTOR.
August E. Wilshusen
BY

Patented June 2, 1942

2,284,936

UNITED STATES PATENT OFFICE 2,284,936

DIRECTION INDICATOR MEANS

August E. Wilshusen, Ypsilanti, Mich.

Application November 28, 1940, Serial No. 367,620

2 Claims. (Cl. 200—59)

This invention relates to switches for controlling right and left turn signals of automobiles and has for its primary object to provide a switch adapted to be manually set in selected positions for indicating a contemplated turn and embodying means operable by a part of the steering mechanism for restoring the switch to a neutral position after the turn has been completed and the automobile has been restored to a straight course.

More specifically, the main object is to provide a switch having a manually movable switch member adapted to be moved in opposite directions to select and operate turn signals, and a restoring device adapted to be automatically positioned in coacting relation with an element movable with the steering mechanism or steering wheel by such movement of the switch member. The restoring means is so constructed that movement of the steering mechanism or steering wheel in the direction of a signalled turn does not alter the position of the switch member, but when the turn is completed, and the steering mechanism or wheel is restored to a straight ahead position, the restoring means is actuated to restore the switch member to its neutral position.

Another object is to provide a switch of the character above mentioned which is extremely simple in construction and which may be mounted directly upon the steering column for actuation by a pin or equivalent element carried directly by the steering wheel or the shaft member which is rotated by the wheel.

Figure 1:
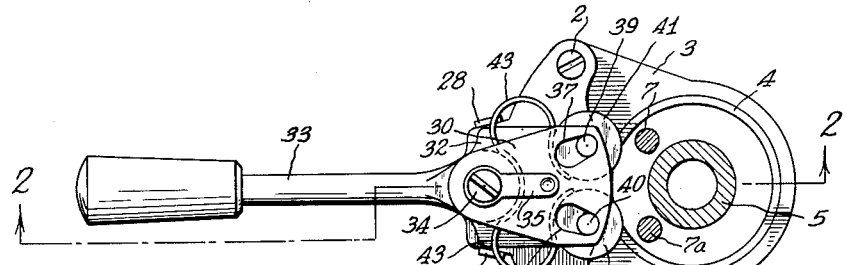
Figure 2:
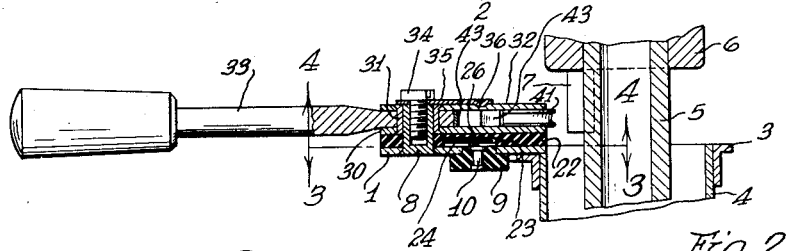
Figure 3:
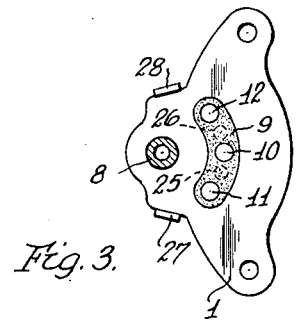
Figure 4:
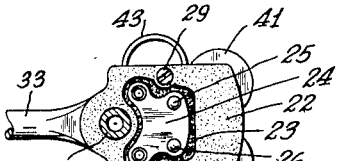
Figure 5:
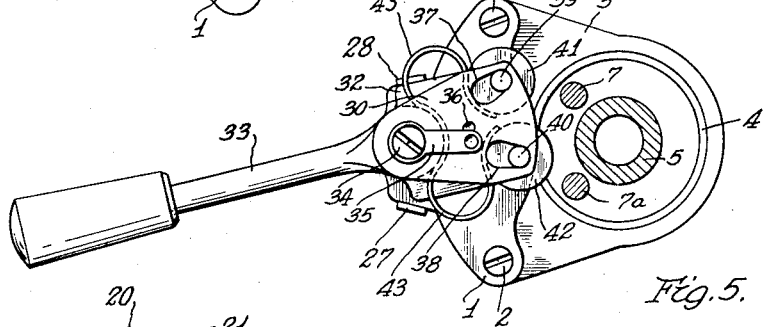
Figure 6:
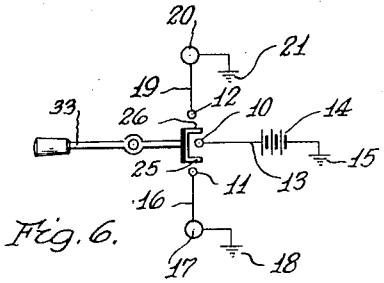

Other objects and advantages will become more fully apparent as reference is had to the accompanying drawing, wherein my invention is illustrated and in which Fig. 1 is a plan of the switch, Fig. 2 is a section taken on the line 2—2 of Fig. 1, Figs. 3 and 4 are views taken respectively on lines 3—3 and 4—4 of Fig. 2, Fig. 5 is a view similar to Fig. 1, illustrating the switch in one of its selective positions, and Fig. 6 is a diagram of the switch and signal circuit.

More specifically, 1 designates a supporting plate attached by screws 2 to a bracket 3 carried by a steering column 4. Within the column 4 is a rotatable shaft 5, which is for the purpose of operating the usual automobile steering mechanism. Upon the upper end of the shaft 5 is secured an element 6, which might be imagined as being the lower end of a steering wheel hub, or as a collar fixed upon the shaft. The element 6 carries a pair of pins 7 and 7a which depend therefrom, and which move in a circular orbit when the shaft is rotated. The pins 7 and 7a constitute actuating means for the switch restoring means hereinafter described, and obviously may take various forms other than that shown by way of example. The sole requirement in this respect is that there be one, but preferably a pair, of members movable in a definite orbit or path incident to rotation of the shaft 5, and consequently incident to steering movements of the automobile.

Mounted upon the plate 1 is a fixed pivot pin 8 and extending through the plate, spaced radially from the pin, is an insulating member 9. The insulating member 9 has three spaced contacts 10, 11 and 12 extending therethrough and all spaced equally in radial directions from the pin 8. As may be seen in Fig. 6, the contact 10 is connected by a wire 13 to a battery 14 which is grounded at 15. The terminal 11 is connected by a wire 16 to a signal lamp 17 which is grounded at 18, and the terminal 12 is connected by a wire 19 to a signal lamp 20 which is grounded at 21. It is apparent that by bridging the contacts 10 and 11 the lamp 17 is illuminated, and by bridging the two contacts 10 and 12 the lamp 20 is illuminated.

Pivoted upon the pin 8 is an insulating element 22 having a recess 23 in its bottom face. In the recess 23 is mounted a resiliently flexible element 24 having two raised contact portions 25 and 26 spaced apart a distance equal to the spacing of the contacts 10 and 11, and 10 and 12. The lower face of the insulating element 22 contacts the upper face of the plate 1 and it is adapted to pivot thereon. Pivotal movement of the insulating element is restricted by upstanding arms or stops 27 and 28 at opposite sides of the plate 1. When the insulating element 22 is pivoted so that it contacts the stop 27 the contact portions 25 and 26 engage the contacts 11 and 10 respectively, thereby bridging the contacts 10 and 11 and causing illumination of the lamp 17. When the insulating element 22 is moved into engagement with the stop 28 the contact portions 25 and 26 engage the contacts 10 and 12, bridging the same, and causing illumination of the lamp 20. When the insulating element 22 is in its mid position between the two stops, as shown in Fig. 4, the contact portions 25 and 26 engage the top of the insulating member 9 on opposite sides of the contact 10, as indicated by dotted lines in Fig. 3. This latter position is the neutral position of the switch.

Attached to the insulating element 22 by screws 29 is a metal plate 30 having a sleeve 31 secured thereto and encircling the pivot pin 8. On the other end of the sleeve 31 is secured a plate 32 of similar shape to the plate 30, and between the two plates is secured a handle 33. The plates 30 and 32 are held on the pivot pin 8 by a screw 34 which at the same time retains a spring finger 35 for engagement with a depression 36 in the adjacent surface of the plate 32. The handle 33 and the two plates 30 and 32 constitute means for pivoting the insulating element 22 to either of its circuit closing positions mentioned above, and spring finger 35 constitutes means for yieldingly holding the plates 30 and 32 and the insulating element in the neutral position.

The plates 30 and 32 have slots 37 and 38 receiving axis members 39 and 40 on rollers 41 and 42 which are disposed between the plates 30 and 32. The slots 37 and 38 are disposed on lines radial with respect to the pivot pin 8 and when the plates 30 and 32 are in the neutral position shown in Fig. 1 these radial lines are spaced approximately 22½° on either side of a line intersecting the axis of the pin 8 and the axis of the steering shaft 5. A leaf spring 43 is bent to engage both rollers 41 and 42 to press them outwardly against the outer ends of their respective slots, and the slots are so proportioned that when the rollers are in engagement with the outer ends of the slots, with the switch in its neutral position, the rollers just clear the orbit of the pins 7 and 7a. The inner ends of the slots are slightly larger so as to permit lateral movement of the axis members therein when the rollers are pressed inwardly as hereinafter described. The rollers are preferably grooved, as shown, in order to induce friction between themselves and the pins 7, and due to the contact of the spring 43 therewith they are held against rotation.

With the mechanism in the position shown in Fig. 1, which is the neutral position the pins 7 and 7a may move past the rollers 41 and 43 as the steering shaft 5 is rotated incident to steering movements of the automobile. When a contemplated turn is to be signalled, by means of the lamp 17, the handle 33 is manually moved from the position shown in Fig. 1 to that shown in Fig. 5. The stops 27 and 28 are so positioned that the extent of movement in either direction is less than 22½°, so that upon such movement of the handle the radial line upon which the roller 42 is disposed is spaced from the line which intersects the axes of the pin 8 and the steering shaft 5.

When the switch is set in the position shown in Fig. 5 it indicates a turn which will be caused by clockwise rotation of the steering shaft 5, and as the shaft 5 is rotated to cause such a turn the pin 7a comes into contact with the roller 42, and is enabled to pass the same by compressing the spring 43 and moving the roller inwardly. After the turn is completed, and the shaft 7a is reversely rotated back to its original position the pin 7a engages the roller 42 and restores the switch mechanism to its neutral position. This action takes place because of the disposition of the slot 38, it being so disposed that the component force exerted by the pin 7a against the roller 42 during clockwise rotation is more nearly in alignment with the radial line upon which the slot is disposed than it is to a perpendicular to said radial line. Upon reverse movement, however, the component force exerted by the pin 7a is nearer a perpendicular to the radial line of the slot than it is to the radial line.

Although a specific embodiment of the invention has been illustrated and described, it will be understood that various changes may be made within the scope of the appended claims without departing from the spirit of the invention, and such changes are contemplated.

What is claimed is:

1. In combination, a vehicle steering column, a shaft reversely rotatable in said column incident to steering movements of the vehicle, a pair of spaced movable elements connected to said shaft and moved thereby in a circular orbit, a bracket secured to said column and having spaced electrical terminals carried thereby, a switch member also having spaced electrical terminals carried thereby pivotally mounted on said bracket and movable about an axis spaced from the axis of said orbit in reverse directions from a neutral to circuit selecting positions with the terminals of said bracket, said switch member comprising a triangular member pivotally mounted at one corner and having slots extending inwardly from the other corners thereof, manual means for moving said switch member, spring pressed rollers mounted in each of said slots for rotation and for sliding movement with respect to said switch member, said slots being arranged radially of said pivotal point whereby upon cocking of said switch member in either of its extreme positions said elements contact one of said rollers and urge it inwardly of said slot in passing in one direction and when returning therepast said element exerts pressure on said roller directly against one wall of said slot.

2. In a switch, a movable member adapted to move reversely in a circular orbit incident to steering movements of a vehicle, a bracket having spaced electrical terminals carried thereby, a switch member also having spaced electrical terminals pivoted on said bracket spaced from the axis of said orbit and movable in reverse directions from a neutral to circuit selecting positions with the terminals of said bracket, manual means for moving said switch member, a pair of rollers having axis members disposed in spaced radial slots in said switch member, spring means yieldingly holding said axis members at the outer ends of respective slots, said slots being of such length that the rollers are spaced from said orbit when said switch is in its neutral position and so spaced that they are alternately moved into said orbit when said switch member is moved to respective selective positions, and means preventing movement of said switch member when either restoring member is in said orbit in a direction other than toward its neutral position.

AUGUST E. WILSHUSEN.